United States Patent [19]

Black

[11] E Re. 31,110

[45] Reissued Dec. 28, 1982

[54] SOLID AXLE WHEEL SUPPORT AND SEALED BEARING CONSTRUCTION

[75] Inventor: John W. Black, Hickory Corners, Mich.

[73] Assignee: Pemco-Kalamazoo, Inc., Kalamazoo, Mich.

[21] Appl. No.: 201,951

[22] Filed: Oct. 29, 1980

Related U.S. Patent Documents

Reissue of:

[64] Patent No.: 4,122,580
Issued: Oct. 31, 1978
Appl. No.: 806,903
Filed: Jun. 15, 1977

[51] Int. Cl.[3] ..... A47B 91/00; F16C 33/00; F16C 1/24

[52] U.S. Cl. ..... 16/46; 308/190; 308/187.1

[58] Field of Search ..... 16/45, 46, 21, 18 G, 16/44, 47; 308/190, 187.1, 5.7; 29/116 R

[56] References Cited

U.S. PATENT DOCUMENTS

| | | | |
|---|---|---|---|
| 1,892,845 | 1/1933 | McGrath | 16/46 X |
| 2,750,238 | 6/1956 | Black, Jr. | 308/187.1 |
| 3,807,817 | 4/1974 | Black | 308/190 |
| 3,881,789 | 5/1975 | Kornylak | 308/187.1 |
| 3,957,147 | 5/1976 | Specht | 193/37 |

FOREIGN PATENT DOCUMENTS

| | | | |
|---|---|---|---|
| 2223200 | 11/1973 | Fed. Rep. of Germany | 16/45 |
| 243299 | 12/1946 | Switzerland | 16/46 |

*Primary Examiner*—Doris L. Troutman
*Attorney, Agent, or Firm*—Blanchard, Flynn, Thiel, Boutell & Tanis

[57] ABSTRACT

Bearing assembly for a wheel primarily for use in casters produced under high production conditions. The bearing is characterized by the provision of a solid shaft with staked ends in association with a resilient seal all arranged for producing a bearing capable of inexpensive manufacture under high production conditions, but also a bearing having close tolerances and thereby capable of long and accurate operation.

5 Claims, 2 Drawing Figures

SOLID AXLE WHEEL SUPPORT AND SEALED BEARING CONSTRUCTION

Matter enclosed in heavy brackets [ ] appears in the original patent but forms no part of this reissue specification; matter printed in italics indicates the additions made by reissue.

FIELD OF THE INVENTION

The invention relates to bearing assemblies primarily for caster wheels produced under high production conditions such as the wheels used for shopping carts, small trucks and similar type devices.

BACKGROUND OF THE INVENTION

Although a variety of ball bearings and ball bearing assemblies have been devised in the past for meeting limitless situations where friction must be minimized, a constant effort is being made to improve the effectiveness of such bearing assemblies while simultaneously lowering their cost. This is of particular importance where the bearings are manufactured in large quantities for a variety of purposes, such as in caster wheels, conveyor wheels, small truck wheels and in wheels for other vehicles or generally similar nature. Where the production of such bearing assemblies is on the order of several hundred or more per hour, it is apparent that even a small reduction in the unit cost of a bearing assembly will result in greater savings, both to the manufacturer of the bearing assemblies and to the users thereof. On the other hand, in view of the critical part played by such bearing assemblies in practically all of their usual locations of use, it is equally apparent that such cost reductions, if any, must be made without sacrificing quality.

Bearings and the wheels associated therewith of this general nature have long been known and many such bearings of the type shown and described in U.S. Pat. No. 3,807,817, assigned to the same assignee as the present application, have long been known. However, in a continuing effort to improve the quality of the product while at the same time reducing its cost, a great deal of effort has been made to detect points in the previous devices at which such improvements and/or cost reductions can be made. Thus, in such wheels and their bearing assemblies as shown in said patent, as well as in other generally similar patents such U.S. Pat. Nos. 3,881,789 and 1,674,087, there are shown axles for the support of the bearings which in turn support the wheels, which axles are hollow and held in place by a fastener, such as a pin or bolt, passed therethrough. This is effective in operation but it involves the step of boring the hole for such fastener and the further step of inserting such fastener therein, all of which steps involve expense. Furher, in the assembly of U.S. Pat. No. 3,807,817, reliance is placed for sealing of the bearing on relatively small bearing seals associated therewith which are separate items involving expense in both the provision thereof and in the assembly thereof and at the same time are relatively small and depend upon their own resiliency for holding themselves in position. It is accordingly desirable to eliminate these seals entirely and thus eliminate the above-mentioned expense resultant therefrom and at the same time to provide for a more efficient and effective dust seal to protect the bearing balls and races.

Accordingly, the objects of the invention include:

1. To provide a bearing and wheel construction adaptable for use under high production conditions which will produce a very inexpensive wheel and yet one which will be solid, firm and capable of long and accurate operation.

2. To provide a bearing and wheel construction, as aforesaid, which will eliminate some of the manufacturing steps now required in certain present constructions of this type but will do so without sacrifice in quality of the resultant product.

3. To provide a bearing and wheel construction, as aforesaid, wherein the separate sealing means now required can be eliminated without sacrifice in the quality of the resultant product.

4. To provide a bearing and wheel construction, as aforesaid, which will have other advantages and economies recognized by persons skilled in the art but which will at the same time provide a bearing capable of withstanding substantial abuse and requiring only minimal maintenance, such as is recognized as required for a variety of commercial applications, such as use in shopping carts.

Other purposes and advantages of the invention will be apparent to persons acquainted with apparatus of this general type upon reading the following specifications and inspection of the accompanying drawings.

SUMMARY OF THE INVENTION

Briefly, the invention contemplates the provision of a wheel having a central opening therethrough with a sleeve received into said opening and the outer races of a pair of bearing assemblies positioned at opposite ends of said sleeve. A central solid shaft is coaxial and internal of said sleeve and carries adjacent its ends the inner races of said bearing assemblies. Appropriate bearing elements are positioned between the races. The respective ends of said sleeve extend axially beyond the bearing assemblies and are each engaged by an end plate, said end plate being preferably of somewhat resilient material and seated on said shaft. The ends of said shaft are then staked against a suitable fork by which said wheel is supported and the fork structure is caused to bear against said end plates for holding same snugly and in dust sealing relationship with the axial ends of said sleeve.

DETAILED DESCRIPTION

Figure 1:
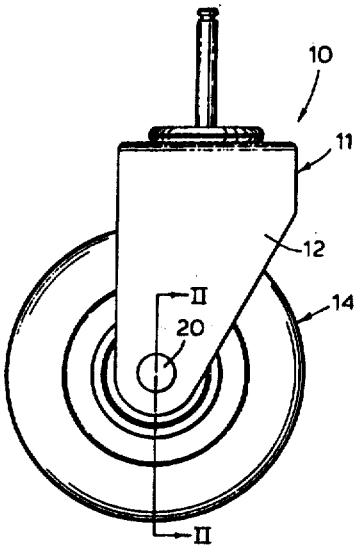
FIG. 1 is an elevational view of a wheel, here a caster wheel, embodying the invention.

FIG. 1 illustrates a swivel caster 10 which includes an inverted U-shaped frame 11 having a pair of parallel legs 12 and 13 straddling the wheel 14. Said wheel also includes a bearing assembly 17 mounted in the central opening 16 of the wheel. An axle 20 extends through the bearing assembly 17 and through a pair of axially aligned openings 18 and 19 in the legs 12 and 13 respectively. The bearing assembly 17 includes a generally tubular thermoplastic bearing sleeve 21 which is mounted within the opening 16. The opposite axial ends of plastic sleeve 21 respectively have radially extending flanges 22 and 23 which extend beyond the correspondingly adjacent surfaces of the wheel 14 as hereinafter further described in more detail.

The wheel 14 comprises an annular portion 24 of any desired shape which is fixed in any convenient manner to the sleeve 21, here by a thermoplastic locking ring 26 which is molded into place between the annular portion 24 and the bearing sleeve 21. This structure is described in detail in my copending application Ser. No. 723,927, filed Sept. 16, 1976.

The bearing sleeve 21 is provided with outer races 27 and 28 which may be, as in this instance, respectively provided with antifriction race liners 31 and 32.

The axle 20 is solid and is provided with shoulders 33 and 34 for the locating of the legs 12 and 13. The axle 20 has an initial shape at its ends 36 and 37, as indicated by the broken lines in FIG. 2, which project through the openings 18 and 19 and are then each upset against the legs 12 and 13 for holding same snugly against the shoulders 33 and 34. The axle is thus fixed firmly in place, held rigidly to said legs and assists in holding said legs rigidly with respect to each other.

Said axle has further shoulders 38 and 39 which locate a pair of end caps 41 and 42 further discussed hereinafter and said axle also has flanges 43 and 44 which define inner bearing races 46 and 47. Said inner bearing races may, as here, be provided with antifriction liners 48 and 49. A series of balls of which two are shown at 51 and 52 occupy in a conventional manner the space between the bearing races or, in this instance, the spaces between respectively facing surfaces of the race liners.

Figure 2:
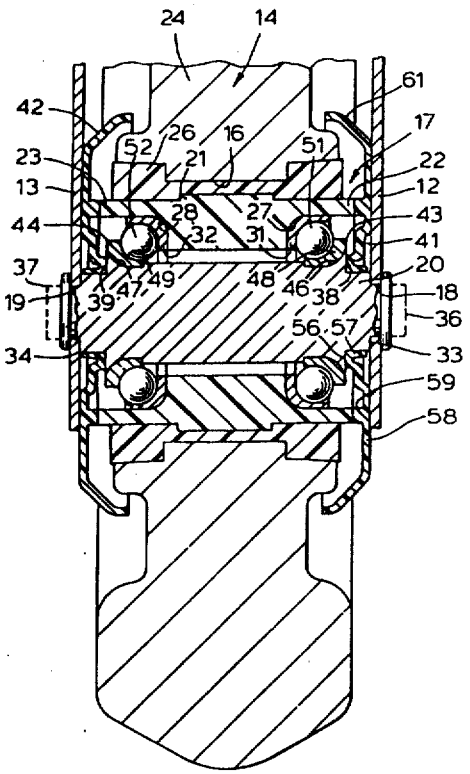
FIG. 2 is a fragmentary sectional view taken on the line II—II of FIG. 1.

Turning now again to the end caps 41 and 42, it will be seen that they are identical but are assembled facing oppositely from each other so as in FIG. 2 to appear as mirror images of each other. Turning first to the end cap 41, same is provided at its radially inner edge with a foot portion having a radial section 56 and an axial section 57. When in installed position, said radial section 56 bears snugly against and is axially limited by the shoulder 38 while the axial section 57 bears snugly against and is supported by the peripheral surface of said axle 20 which is adjacent to said shoulder 38. The end cap then extends radially outwardly and axially away from the center of the bearing assembly to a central portion 58 which bears against the inner surface of the leg 12. Said central portion 58 has an annular seal 59 extending axially centrally of the bearing assembly sufficiently to be in contact with the outwardly facing end of the flange 22. The parts are so proportioned that when the end 36 of the axle is upset as shown in solid lines in FIG. 2, the leg 12 will not only be urged snugly against the shoulder 33 but will also be urged snugly against the central section 58 of the end cap 41 and the annular flange 59 urged snugly against the end flange 22 of the sleeve 21. Likewise such urging of the central section 58 also urges the radial portion 56 of said end cap snugly against the shoulder 38 of the axle. Said end cap may if desired be provided with an inwardly extending portion 61 partly for the sake of appearance and partly for the further protection of the seal area formed by the flange 59 and end 22.

Thus, the end cap, or dust cap, 41 also constitutes the seal for the bearing and same is held snugly in sealing position by the single upsetting step by which the end 36 of the axle is upset for holding the leg 12 solidly in position.

The leftward end of the apparatus including the dust cap 42, the flange 23 and end 37 of the axle are all as seen in FIG. 2 mirror images of the parts above described in connection with the rightward (as seen in FIG. 2) portions of the described device and it will be evident upon inspection of the drawing in the light of the description already given for the rightward side of the device and hence no further description needs to be given with respect thereto.

ASSEMBLY

The assembly has been somewhat indicated above but will be reviewed to insure a complete understanding of the invention.

With the liners 48 and 49 positioned in any conventional manner (as by being split or by being sufficiently resilient to go over the adjacent flanges 43 and 44 or installed in accordance with the teaching in my U.S. Pat. No. 3,807,817), the balls are inserted in any conventional manner and the sleeve 21 and associated liners are assembled therewith in any conventional manner. The bearing assembly and axle thus assembled are now held in appropriate position with respect to the wheel annulus 24 and a locking strip 26 molded in place for locking the bearing assembly rigidly into position within the wheel annulus 24 as taught in my aforesaid application Ser. No. 723,927, filed Sept. 16, 1976. The end caps 41 and 42 are placed in position against the shoulders 38 and 39, the legs 12 and 13 snapped into place over the axle ends 36 and 37 and the axle ends then upset tightly against the legs 12 and 13 as shown.

This results in an extremely simple but strong structure, insures a rigid holding of the axle with respect to the legs 12 and 13 as well as a rigid holding of the legs with respect to each other. It further insures a firm sealing of the end caps against the central sleeve 21 for effecting a sealing of the bearing zone and thereby eliminates the separate bearing seals which have been conventionally used in prior known devices.

Although a particular preferred embodiment of the invention has been disclosed in detail for illustrative purposes, it will be recognized that variations or modifications of the disclosed apparatus, including the rearrangement of parts lie within the scope of the present invention.

The embodiments of the invention in which an exclusive property or privilege is claimed are defined as follows:

1. A wheel construction for a tire having a central coaxial opening therethrough, comprising:

a cylindrical sleeve fixedly disposed in said central opening in said tire, said sleeve having a portion of reduced inside diameter spaced from both axial ends thereof;

a pair of outer bearing races snugly disposed within said sleeve against the opposite axial ends of said portion of reduced diameter;

a solid cylindrical axle having spaced portions of reduced diameter defining spaced shoulders near the opposite ends thereof, said axle being disposed coaxially within and spaced from said reduced portion of said sleeve and extending axially beyond both ends thereof;

a pair of inner bearing races encircling said axle and radially aligned with said outer bearing races and antifriction means positioned between respective pairs of said bearing races;

a pair of axially spaced first upset portions on said axle located between said shoulders and pair of inner bearing races to fixedly hold said inner bearing races to said axle, said first upset portion defining a seal shoulder between said inner bearing races at one end of said axle and the respectively adjacent shoulder and including a generally circular and resiliently flexible end cap encircling said axle and bearing against said seal shoulder;

frame legs encircling said axial extensions of said axle and bearing snugly against said shoulders and a second upset portion at the end of each axial extension bearing against the leg adjacent thereto and holding same firmly against the respectively adjacent shoulder, said end cap having a portion thereof extending axially outwardly from said shoulder to bear against the inner face of the axially adjacent frame leg and said end cap further having an annular seal ring on the inner surface thereof bearing against the adjacent end of said cylindrical sleeve, the parts being so proportioned that when said frame leg is in position against said shoulder, the end cap is urged snugly against the seal shoulder and the annular seal ring thereof urged against the adjacent end of said cylindrical sleeve;

whereby said inner bearing races are locked permanently to said axle and said frame legs are locked permanently and firmly with respect to said axle and through said axle held rigidly with respect to each other all by the material of said solid axle.

2. The wheel construction according to claim 1, wherein said cylindrical sleeve has an axial extension thereon extending axially beyond the bearing race associated with said sleeve for engagement with said annular seal ring.

3. The wheel construction according to claim 2, wherein said end cap is of resilient material for absorbing variations in tolerance and maintaining a snug sealing relationship against and with respect to said axle and said axial extension on said cylindrical sleeve.

4. A wheel construction for a tire having a central coaxial opening therethrough, comprising:

a cylindrical sleeve fixedly disposed in said central opening in said tire, said sleeve having a portion of reduced inside diameter spaced from both axial ends thereof;

a pair of outer bearing race means located at the opposite axial ends of said portion of reduced diameter;

a solid cylindrical axle having spaced portions of reduced diameter defining spaced shoulders near the opposite ends thereof, said axle being disposed coaxially within and spaced from said reduced portion of said sleeve and extending axially beyond both ends thereof;

a pair of inner bearing race means on said axle and radially aligned with said outer bearing race means and antifriction means positioned between respective pairs of said bearing race means;

frame legs encircling said axial extensions of said axle and bearing snugly against said shoulders and means at the end of each axial extension bearing against the leg adjacent thereto and holding same firmly against the respectively adjacent shoulder;

a seal shoulder on said axle between said inner bearing race means at one end of said axle and the respective adjacent shoulder;

a generally circular end cap made of a compressible thermoplastic material encircling said axle and bearing against said seal shoulder, said end cap having a portion thereof extending axially outwardly from said shoulder to bear against the inner face of the axially adjacent frame leg and said end cap further having an annular seal ring on the inner surface thereof bearing against the adjacent end of said cylindrical sleeve, the parts being so proportioned that when said frame leg is in position against said shoulder, the end cap is urged snugly against the seal shoulder and the annular seal ring thereof urged against the adjacent end of said cylindrical sleeve;

whereby said frame legs are held firmly with respect to said axle and through said axle held rigidly with respect to each other and said annular seal ring of said compressible end cap is compressed between said frame legs and said cylindrical sleeve for sealing said bearing means from dust.

*5. A wheel construction for a tire having a central coaxial opening therethrough, comprising:*

*a cylindrical sleeve (21) fixedly disposed in said central opening in said tire, said sleeve having a portion of reduced inside diameter spaced from both axial ends thereof and a cylindrical extension defining a first annular seal surface (52,53) integrally provided at opposite axial ends thereof;*

*a pair of outer bearing race means (38,39) located at the opposite axial ends of said portion of reduced diameter;*

*a cylindrical axle (20) disposed coaxially within and spaced from said reduced portion of said sleeve;*

*a pair of inner bearing race means (41,42) on said axle and radially aligned with said outer bearing race means and anti-friction means (43) positioned between respective pairs of said bearing race means;*

*frame legs (12,13) and securement means (56,57,58) for effecting an operative connection of said frame legs to said axle;*

*a seal shoulder (A) on said axle spaced axially inwardly along said axle from both of the ends thereof;*

*a generally circular end cap (48,49) made of a compressible thermoplastic material encircling said axle and having integral seal means (50,51) bearing against said seal shoulder, said end cap having an axial section (B) thereof extending axially from said seal means to bear against the inner face of the axially adjacent frame leg and said end cap further having an integral second annular seal surface (C) thereon spaced radially outwardly from said axial section bearing against said first annular seal surface (52,53), the parts being so proportioned that when said frame legs are in position adjacent the ends of said axle, said seal means (50,51) on said end cap is urged snugly against said seal shoulder (A) and said first (52,53) and second (C) annular seal surfaces urged into engagement with each other;*

*whereby said frame legs are held firmly with respect to said axle and through said axle and said securement means held rigidly with respect to each other and said second annular seal surface of said compressible end cap is urged into engagement with said first annular seal surface on said cylindrical sleeve for sealing said bearing means from dust.*

* * * * *